United States Patent
Sartori et al.

(10) Patent No.: US 8,068,438 B2
(45) Date of Patent: Nov. 29, 2011

(54) METHOD FOR COOPERATIVE RELAYING WITHIN MULTI-HOP WIRELESS COMMUNICATION SYSTEMS

(75) Inventors: Philippe J. Sartori, Algonquin, IL (US); Yufei W. Blankenship, Kildeer, IL (US); Brian K. Classon, Palatine, IL (US); Ajit Nimbalker, Alrington Heights, IL (US); Sebastien Simoens, Lyons (FR); Eugene Vistosky, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 524 days.

(21) Appl. No.: 12/265,234

(22) Filed: Nov. 5, 2008

(65) Prior Publication Data

US 2010/0110967 A1    May 6, 2010

(51) Int. Cl.
*H04L 12/26* (2006.01)
*H04Q 7/28* (2006.01)
*H04J 3/16* (2006.01)

(52) U.S. Cl. .......................... 370/252; 370/338; 370/465
(58) Field of Classification Search .................. 370/252, 370/338, 392, 352, 465, 401, 238
See application file for complete search history.

(56) References Cited

U.S. PATENT DOCUMENTS

| | | | |
|---|---|---|---|
| 6,539,028 B1 * | 3/2003 | Soh et al. | 370/445 |
| 6,819,676 B1 * | 11/2004 | Min | 370/448 |
| 7,269,147 B2 * | 9/2007 | Kim et al. | 370/312 |
| 7,400,856 B2 | 7/2008 | Sartori et al. | |
| 7,797,604 B2 * | 9/2010 | Lee et al. | 714/748 |
| 7,821,980 B2 * | 10/2010 | Chakrabarti et al. | 370/315 |
| 2003/0167433 A1 * | 9/2003 | Wengerter et al. | 714/749 |
| 2005/0078678 A1 * | 4/2005 | Kim et al. | 370/390 |
| 2008/0137585 A1 * | 6/2008 | Loyola et al. | 370/315 |
| 2008/0160912 A1 * | 7/2008 | Kim et al. | 455/15 |
| 2009/0031183 A1 * | 1/2009 | Hoshino et al. | 714/748 |

FOREIGN PATENT DOCUMENTS

| | | |
|---|---|---|
| WO | 2006071187 A2 | 7/2006 |
| WO | 2008108708 A1 | 9/2008 |

OTHER PUBLICATIONS

Jang-Wook Moon, John M. Shea and Tan F. Wong—"Collaborative Decoding Using Turbo Codes," IEEE Military Communications Conference, 2003. MILCOM 2003. vol. 1, Oct. 2003—pp. 452-457.
J. Nicholas Laneman, David N.C. Tse and G. W. Wornell—"Cooperative Diversity in Wireless Networks: Efficient Protocols and Outage Behavior," IEEE—vol. 50, No. 12—Dec. 2004.—pp. 3062-3080.
Younes Hairej, Andreas Darmawan and Hiroyuki Morikawa—"Cooperative Diversity using Soft Forwarding and Distributed Decoding"—B-5-16—2007 p. 430.
PCT/U2009/061412 - International Search Report with Written Opinion mailed May 31, 2010 - 11 pages.

* cited by examiner

*Primary Examiner* — Andrew Lee
(74) *Attorney, Agent, or Firm* — Randi L. Karpinia (57) ABSTRACT

A method for cooperative relaying within multi hop wireless communication systems includes a base station, in an attempt to decode a data packet, combining hard sliced channel bits and Logarithmic Likelihood Ratio (LLR) quality information received from relay stations who had also received the data packet with stored information about the data packet.

14 Claims, 5 Drawing Sheets

*FIG. 5*

METHOD FOR COOPERATIVE RELAYING WITHIN MULTI-HOP WIRELESS COMMUNICATION SYSTEMS

FIELD OF THE DISCLOSURE

The present disclosure relates generally to multi hop wireless communication systems; and more particularly to a method for cooperative relaying within multi hop wireless communication systems.

BACKGROUND

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of adhoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination Networks implementing one hop links between a base station (BS) and a subscriber station (SS) can severely stress link budgets at the cell boundaries and often render the subscribers at the cell boundaries incapable of communicating using the higher-order modulations that their radios can support. Pockets of poor-coverage areas are created where high data-rate communication is impossible. This in turn brings down the overall system capacity. While such coverage voids can be avoided by deploying BSs tightly, this drastically increases both the capital expenditure (CAPEX) and operational expenditure (OPEX) for the network deployment. A cheaper solution is to deploy relay stations (RSs) (also known as relays or repeaters) in the areas with poor coverage and repeat transmissions so that subscribers in the cell boundary can connect using high data rate links.

Even with the deployment of relay stations within a network, there remain times and circumstances when the transmissions are nevertheless not received reliably at a given desired level of quality of service. Various causes exist for this result, including but not limited to shadow fading and other propagation issues. Performance requirements can also pose an impact. For example, as data transmission rates demands continue to increase (leading frequently to a corresponding increase in bandwidth), the ability of an otherwise in-range communication device to successfully effect a desired level of service without a concurrent significant increase in transmission power usually becomes impaired.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method is provided herein for cooperative relaying within multi hop wireless communication systems, the method comprises: transmitting one or more data packets by a subscriber station; receiving the one or more data packets by one or more relay stations and a base station; sending by the one or more relay stations information about the one or more data packets including a plurality of hard sliced channel bits and a Logarithmic Likelihood Ratio (LLR) quality information to the base station; combining by the base station the information received from the one or more relay stations with stored information about the one or more data packets; attempting by the base station to decode the transmission from the subscriber station using the combined information; determining by the base station whether or not the decoding was successful; and when the decoding is not successful and a predetermined time period has passed, presuming an implicit negative acknowledgement (NACK) at the subscriber station.

Cooperative relaying techniques may prove a powerful means to increase system-level performance, both in terms of spectral efficiency and coverage reliability. However, cooperative relaying techniques can be a challenge to implement. With a cooperative relaying scheme, the destination receives signals from both the data source and one or more relay. Cooperative relaying therefore requires knowledge of soft information at the destination to perform combining. Thus, with cooperative relaying, the relay(s) needs to send the soft information to the destination.

Sending soft information is a very costly operation since one information bit is normally represented by a Logarithmic Likelihood Ratio (LLR), a real number typically quantized and represented by eight bits. Sending all the LLRs from the relay(s) to the destination would then be prohibitive, given the large amount of bandwidth it would require. Thus, there is a need for a reduced feedback scheme to send soft information from the relay to the destination.

Cooperative Relaying

Figure 1:
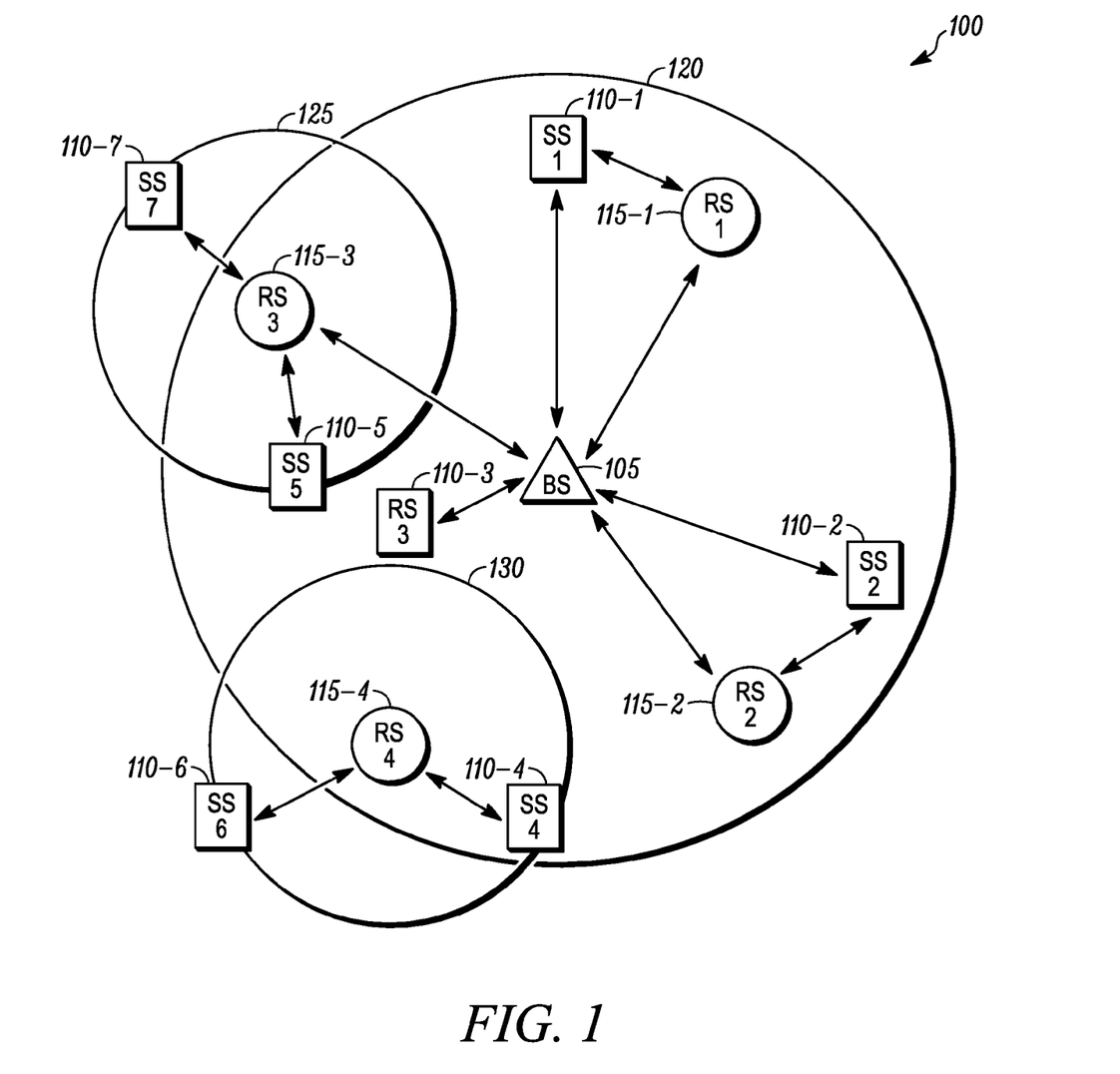
FIG. 1 illustrates a wireless communication network for use in the implementation of at least some embodiments of the present invention.

FIG. 1 illustrates a wireless communication network 100 for use in the implementation of at least some embodiments of the present invention. FIG. 1 for example, can be an IEEE 802.16 network. (For any IEEE standards recited herein, see: http://standards.ieee.org/getieee802/index.html or contact the IEEE at IEEE, 445 Hoes Lane, PO Box 1331, Piscataway, N.J. 08855-1331, USA.)

As illustrated, the wireless communication network 100 includes at least one base station 105 for communication with a plurality of subscriber stations 110-$n$ (also known as mobile stations or mobile terminals). The wireless communication network 100 further includes a plurality of relays 115-$n$ (also known as relay stations or repeaters). The relays 115-$n$ are deployed in the areas with poor coverage and repeat transmissions so that subscriber stations 110-$n$ in a cell boundary can connect using high data rate links. In some cases relays 115-$n$ may also serve subscriber stations 110-$n$ that are out of the coverage range of the base station 105. In some networks, the relays 115-$n$ are simpler versions of the base station 105, in that they do not manage connections, but only assist in relaying data. Alternatively, the relays 115-$n$ can be at least as complex as the base station 105.

The present invention provides a method for the implementation of Hybrid Automatic Repeat reQuest (HARQ) in cooperative Decode and Forward (D&F) relaying. Hybrid Automatic Repeat ReQuest (HARQ) is a technique that enables faster recovery from errors in wireless communication networks by storing corrupted packets in the receiving device rather than discarding them. Even if retransmitted packets have errors, a good packet can be derived from the combination of bad ones. In cooperative D&F relaying, a path involving a certain number of relays (for example, Relay Stations RS 115 of FIG. 1) is established between the source (for example, Base Station BS 105 in FIG. 1) and the destination (for example the Subscriber Stations 110 in FIG. 1). It will be appreciated by those of ordinary skill in the art that a deployment of cooperative relaying can involve several layers of parallel relays between a source and a destination. A node belonging to a given layer combines transmissions from nodes belonging to previous layers and attempts to decode the packet. It then forward a signal (not necessarily identical to what it received) to the next layers. For example, in FIG. 1, RS 115-1 has a single predecessor so it cannot combine signals, whereas Subscriber Station 110-1 can combine the signals from its two predecessors (BS 105 and RS 115-1). Each RS 115 can forward the same codeword as the BS 105 enabling Chase combining at the MS, or can forward a different codeword derived from the same information packet, enabling Incremental Redundancy (IR) processing at the MS.

In Chase combining, each retransmission is identical to the original transmission, and with incremental redundancy (IR) the retransmissions may include new redundancy bits available from the channel encoder. In partial Chase combining, the retransmissions can be a subset of the original transmission. Therefore, IR can achieve better performance than Chase combining but it requires additional signaling since the details of the new redundancy bits needs to be communicated to the receiver.

HARQ Process with Approximate LLR Values

Link level studies show that even without perfect soft information, it is possible to have a sizeable Hybrid ARQ (HARQ) gain when implementing the present invention. In particular, sending hard-sliced values of the LLRs of the channel bits with an average LLR value (linear) or exponentially-averaged (EESM) LLR value shows good performance.

It was shown that good performance can be obtained by using the hard-sliced value of the channel bits along with quality information of the soft bits. For Chase combining, after J-th transmission, the bit LLRs of different transmissions corresponding to the same code bit are accumulated as follows:

$$L_{comb,i}^{(J)} = \sum_{j=1}^{J} L_i^{(j)}, i = 0, \ldots, N-1, \quad (1)$$

Where N is the number of code bits and $L_i^{(j)}$ is the LLR of the $i^{th}$ code bit during $j^{th}$ transmission. And the stream of $\{L_{comb,i}^{(J)}\}$ is passed to the channel decoder. Since bit LLR of each bit at each transmission needs to be saved, a significant amount of memory is needed.

For IR, the LLRs are just concatenated unless wrap-around occurs. If there is wrap-around, (1) can be applied to those bits that are repeated.

If Chase combining is used, the combining process can be done by using the average LLR magnitude. For each transmission j, j=1, ..., J-1, the average magnitude of the bit LLRs is calculated and saved:

$$|L_{avg}^{(j)}| = \frac{1}{N} \sum_{i=1}^{N} |L_i^{(j)}| \quad (2)$$

At transmission J, the LLR of the i-th bit is calculated with $$L_{comb,i}^{(J)} = L_i^{(J)} + \sum_{j=1}^{J-1} \text{sign}(L_i^{(j)})|L_{avg}^{(j)}|, i = 0, \ldots, N-1. \quad (3)$$

With the average-LLR method, the memory needed for each transmission j is reduced to N bits (for the sign of $L_i^{(j)}$) and one magnitude ($|L_{avg}^{(j)}|$), j=1, ..., J-1. The memory savings is (N1) magnitudes. Due to approximating each $|L_i^{(j)}|$ with a single $|L_{avg}^{(j)}|$, i=0, ..., N-1, a performance loss is incurred.

For IR, a similar process can be employed. The LLR over previous transmissions are averaged altogether. The following vector:

$$\begin{bmatrix} \text{sign}(L_0^{(1)})|L_{avg}^{(1)}|, \ldots, \\ \text{sign}(L_{N(1)-1}^{(1)})|L_{avg}^{(1)}|, \ldots, \\ \text{sign}(L_{N(J-2)}^{(J-1)})|L_{avg}^{(J-1)}|, \ldots, \\ \text{sign}(L_{N(J-1)-1}^{(J-1)})|L_{avg}^{(J-1)}|, \\ L_{N(J-1)}^{J}, \ldots, \\ L_{N(J)-1}^{J} \end{bmatrix}$$

is the LLR vector used for decoding after the $J^{th}$ transmission, with $$N(j) = \sum_{m=1}^{j} n(m),$$

and n(m) is the number of transmitted bits during the $m^{th}$ transmission. If there is wrap-around, the Chase combining equation can be used.

Figure 2:
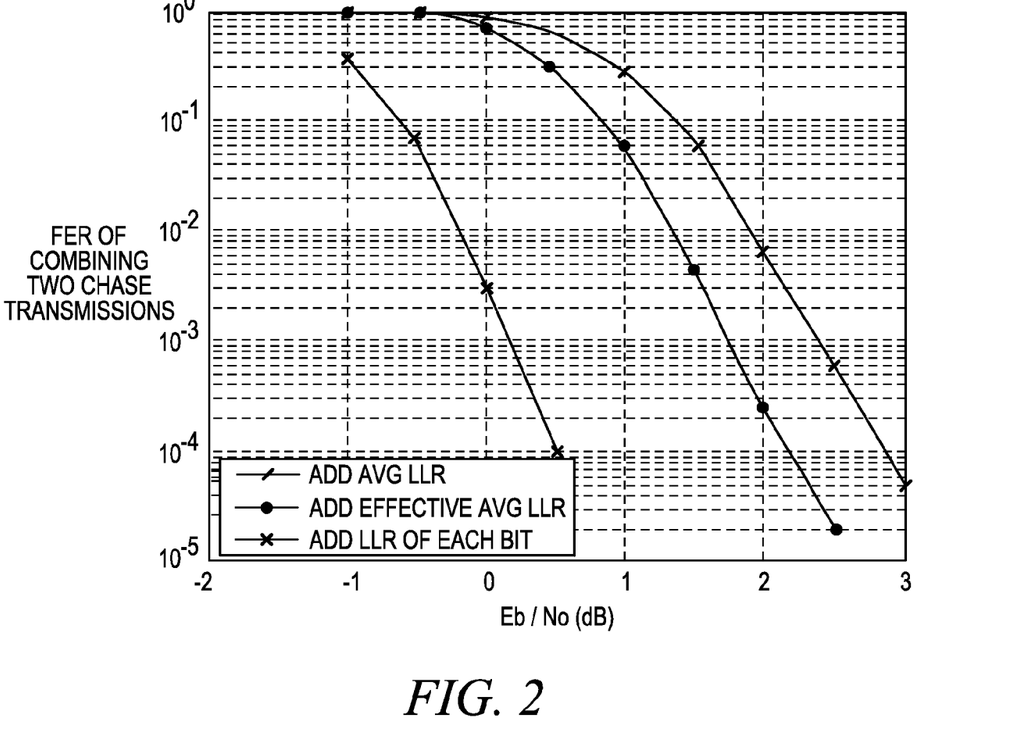
FIG. 2 is a graph of simulation results for the frame error rate (FER) of combining two Chase combining transmissions with three different methods.
Figure 3:
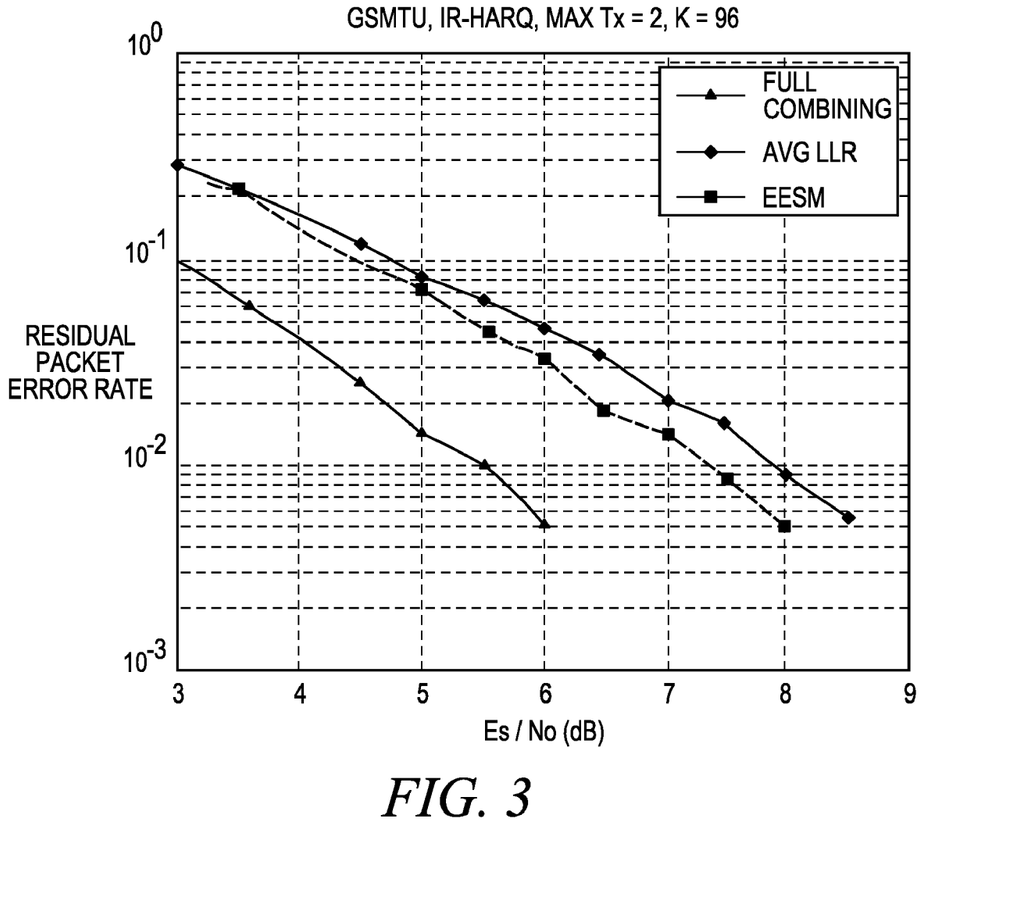
FIG. 3 is a graph of simulation results for the frame error rate (FER) of combining two Incremental Redundancy (IR) combining transmissions with three different methods.

A similar but sometimes more efficient processing can be done by using the effective Signal-to-noise ratio (SNR) for each transmission instead of a process based on the average LLR values. As an example, three Chase combining schemes ("regular", average LLR, EESM-averaged LLR) are simulated with Quadrature Phase Shift Keying (QPSK), rate ½, and information block size k=60 bytes, and two transmissions. IID Rayleigh fading channel and turbo coding technique are assumed. The simulation results in FIG. 2 show that average LLR combining (labeled "add avg LLR") suffers about 2.3 dB loss from the exact LLR combining (labeled "add LLR of each bit"), while effective average LLR combining (labeled "add effective average LLR") gains about 0.5 dB from the average LLR combining. For IR (see FIG. 3) there is also a solid 0.5 dB gain when effective average LLR combining is used instead of average LLR combining. Note that while these two schemes (average LLR and EESM) do not perform as well as 'regular' HARQ combining, they require much less information about previous transmissions since for instance in the case of the add average LLR scheme, only an average LLR value and the hard sliced values need to be known. As explained later, this can be used to design a low-feedback HARQ scheme for cooperative networks.

Description of the Algorithm

The present invention provides a protocol for cooperative relaying. This protocol provides a method for complete soft information for each transmission which does not need to be wirelessly transmitted by any of the entities involved in the process.

The following assumptions are made:
1. An uplink transmission (from the MS to the BS) is assumed.
2. A single relay is involved, and when necessary, a cooperative HARQ scheme is established between the relay and the BS.
3. It is assumed that a dedicated section of the frame is reserved for relay transmission, both on the uplink and on the downlink.

Note that these assumptions are made only for ease of explanation. For instance, the extension to a cooperative scheme with more than one relay is straightforward; or, for downlink cooperative relaying, the process would be similar.

Figure 4:
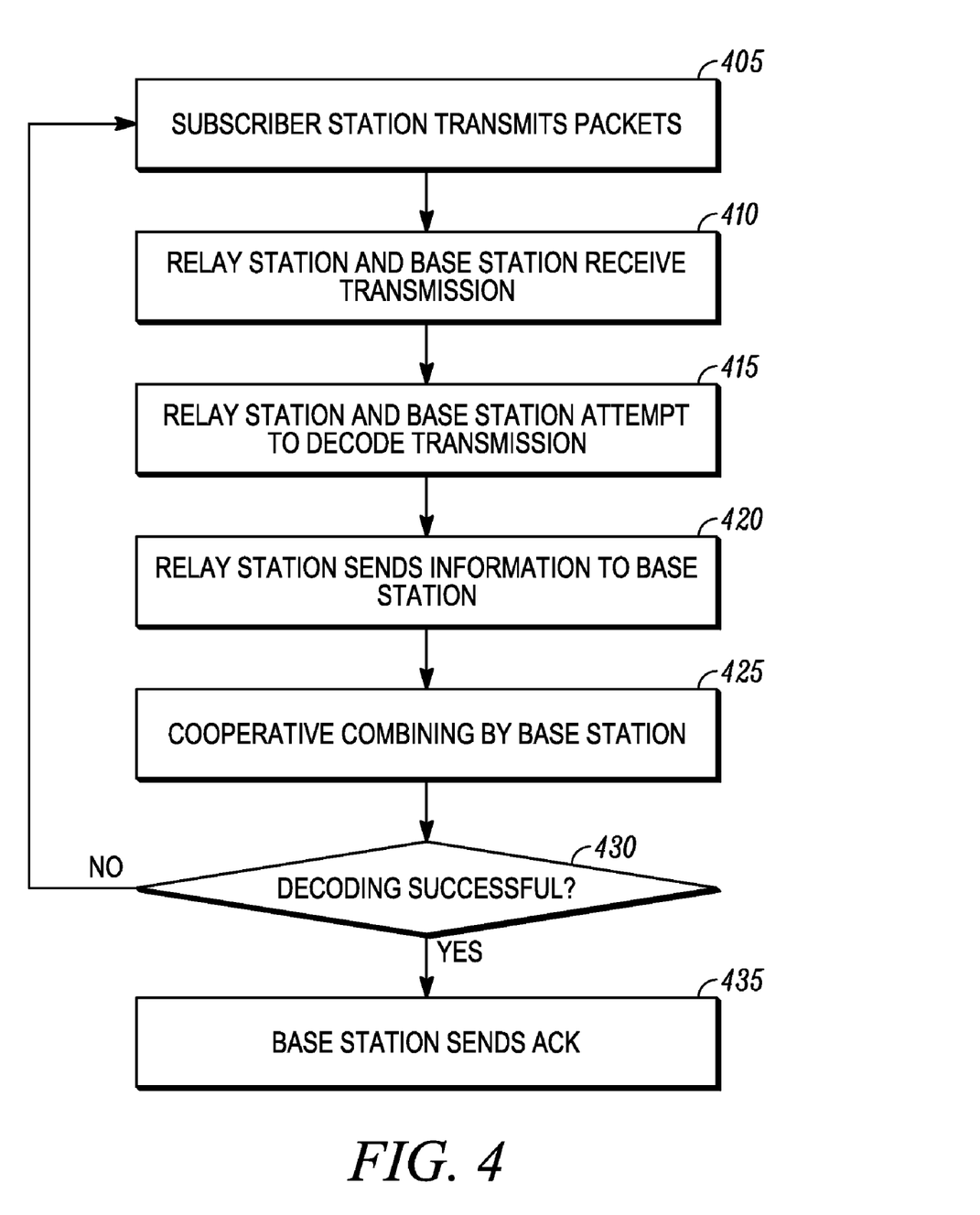
FIG. 4 is a flowchart illustrated a method for cooperative relaying in accordance with some embodiments of the present invention.

The present invention provides a cooperative scheme based on the HARQ process with approximate LLR value processing. This method relies on the fact that good performance can be achieved by using hard sliced channel bits along with quality information of the soft bits. This quality information can be, for example:

The average LLR value
The effective SNR value
The 'binned' average LLR value
The 'binned' effective SNR value FIG. 4 is a flowchart illustrated a method 400 for cooperative relaying in accordance with some embodiments of the present invention. The method 400 specifically illustrates implementation of cooperative relaying for uplink transmission. As illustrated, at Step 405, a subscriber station 110 transmits one or more data packets. Next, in Step 410, a relay station 115 and a base station 105 each receive the transmission sent from the subscriber station. Next, in Step 415, the relay station 115 and the base station 105 each attempt to decode the received transmission at a time T (initial transmission attempt). Next, in Step 420, at a time T', the relay station 115 sends to the base station 105 hard sliced channel bits and a LLR quality information (approximate LLR transmission). Next, in Step 425, the base station 105 combines the information received from the relay station 115 with stored information about the transmission and attempts to decode the transmission from the subscriber station 110 once again (cooperative combining). At Step 430, it is determined whether or not the decoding was successful in Step 425. When the decoding is not successful, the process is repeated by cycling back to Step 405. (implicit negative acknowledgement (NACK)) When the decoding is successful, in Step 435, the base station 105 sends an acknowledgement (ACK) to both the subscriber station 110 and the relay station 115 and the transmission of the packet is complete.

In an alternate embodiment of the present invention, a plurality of relay stations 115-n receive and process the transmission including sending hard sliced channel bits and a LLR quality information (approximate LLR transmission) to the base station. In this embodiment, the plurality of received information transmissions from the plurality of relay stations will all be combined at the base station.

In another alternate embodiment, the same process can be applied on a downlink.

In another alternate embodiment, at Step 430, when the decoding is not successful, the base station can send an explicit NACK to the Subscriber Station 110 and Relay Station 115 rather than implicitly NACKing.

It will be appreciated that, in accordance with various embodiments of the present invention, the amount of feedback can be adaptive, depending on the relay station to base station link (for an uplink transmission). For example, if a link is bad, only one LLR quality information value (such as the average LLR value) can be sent. If the link quality is good, the LLRs can be binned, and the average LLR value per bin is sent. The LLR quality information metric can change, for example, it can be effective SNR for Chase combining and average LLR value for IR.

Reliability-Based Cooperative Relaying Scheme

Figure 5:
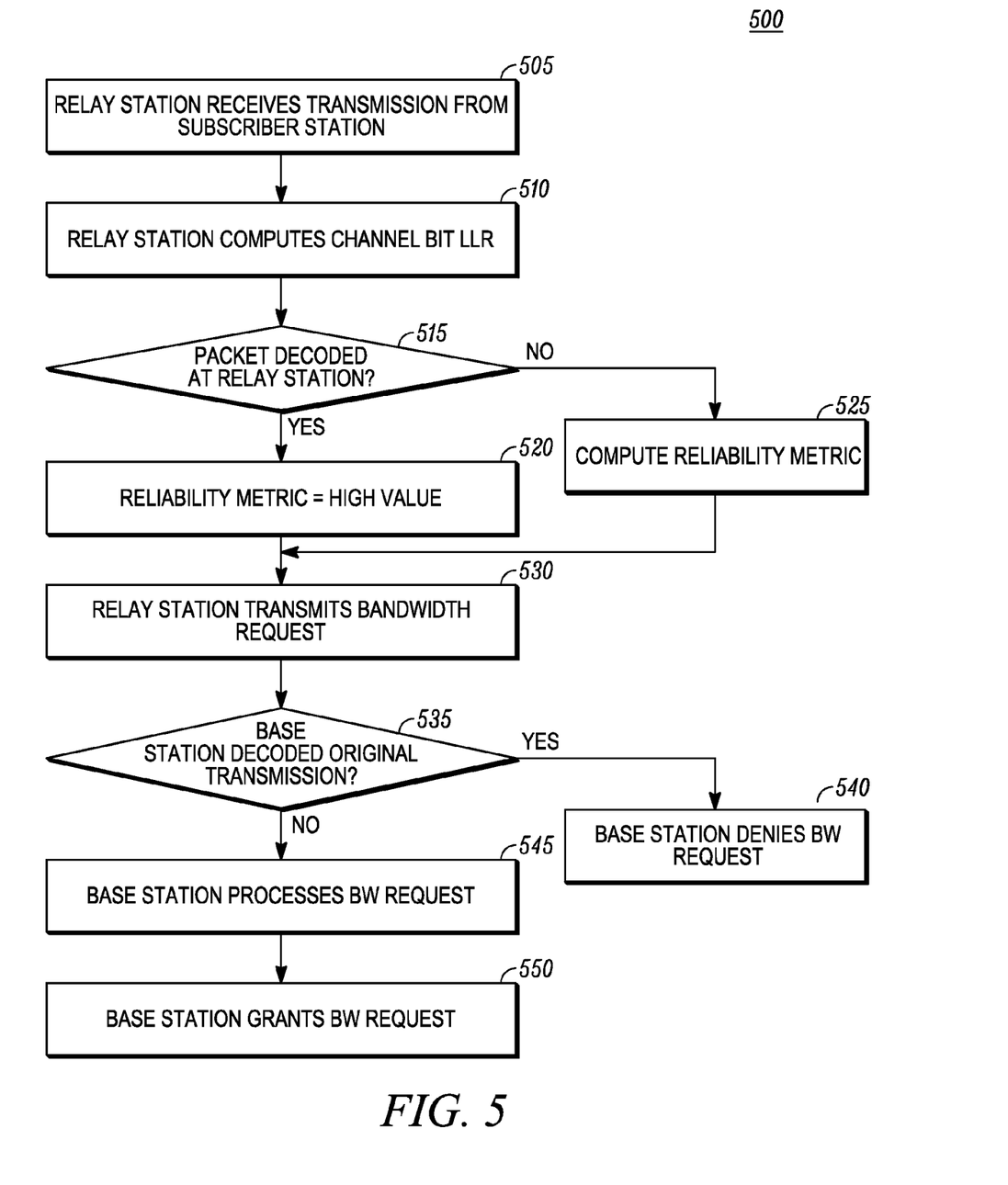
FIG. 5 illustrates an example of the utilization of cooperative relaying in accordance with some embodiments of the present invention.

FIG. 5 illustrates an example of the utilization of cooperative relaying in accordance with some embodiments of the present invention. It will be appreciated by those of ordinary skill in the art that LLR-based cooperative relaying protocol can be enhanced by taking into account the quality of the received soft information at the relay station (RS).

As illustrated in FIG. 5, the operation 500 begins with the relay station receiving the subscriber station's transmission at Step 505. Next, in Step 510, the relay station computes the channel bit LLRs. Next, in Step 515, the relay station attempts to decode the packet, and it is determined whether or not the packet is successfully decoded at the RS. When the packet is successfully decoded, the operation continues to Step 520 in which a very high value of the reliability metric is set for inclusion in a bandwidth (BW) request. When the packet is not successfully decoded, the operation continues to Step 525 in which the RS computes a reliability metric based on channel bit LLRs."

After both Steps 520 and 525, in Step 530, the relay station sends a bandwidth (BW) request to the base station (BS). In the BW request, a single metric indicating the quality, or reliability, of the received soft information is indicated. A reliability metric can be the average magnitude of the channel bit LLRs, $|L_{avg}^{(j)}|$, as defined in Equation (1) above.

Next, in Step 535, it is determined whether or not the original subscriber station's direct transmission was successfully decoded at the BS. When subscriber station's direct transmission was successfully decoded at the BS previously, the operation continues to Step 540 in which the BS does not grant any BW to the RS. When the subscriber station's direct transmission was not successful decoded previously, the process continues to Step 545 in which the BS processes the BW request and, based on the provided reliability metric, determines an additional number of channel bit LLRs that are needed at the BS to result in a likely successful decoding of the packet. Next, in Step 550, the BS grants BW to the RS to transmit the determined number of channel bit LLRs.

If the BW request indicates successful decoding at the RS, the BS grants BW for transmission of the entire packet from the RS. The reliability-based metric can be further used in a cooperative relaying scheme involving multiple RS. In this case, each RS sends a BW request indicating the reliability of its accumulated soft information. Based on the provided reliability metrics, the BS may choose to grant BW for transmission of the channel bit LLRs to a subset of the reporting RSs, with reliability metrics above some threshold. Furthermore, the BS may grant BW to a single RS reporting successful decoding of the subscriber station's packet.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for cooperative relaying within multi hop wireless communication systems, the method comprising:
   transmitting one or more data packets by a subscriber station;
   receiving the one or more data packets by one or more relay stations and a base station;
   sending by the one or more relay stations information about the one or more data packets including a plurality of hard sliced channel bits and a Logarithmic Likelihood Ratio (LLR) quality information to the base station;
   combining by the base station the information received from the one or more relay stations with stored information about the one or more data packets;
   decoding of the transmission from the subscriber station using the combined information by the base station; and
   requesting a retransmission from the subscriber station when the decoding is not successful.

2. The method of claim 1, further comprising:
   repeating the transmitting, receiving; sending; combining; and decoding steps in response to the retransmission request.

3. The method of claim 1, further comprising after the receiving step:
   decoding the received one or more data packets by the one or more relay stations and the base station.

4. The method of claim 1, further comprising:
   when the decoding is successful, sending an acknowledgement (ACK) by the base station to both the subscriber station and the one or more relay stations.

5. The method of claim 1, further comprising:
   when the decoding is not successful, sending by the base station an explicit NACK to the Subscriber Station and the one or more Relay Stations.

6. The method of claim 5, further comprising:
   repeating the transmitting, receiving; sending; combining; and decoding steps in response to the explicit NACK.

7. A method for cooperative relaying within multi hop wireless communication systems, the method comprising:
   receiving at a relay station, a transmission of one or more data packets from a subscriber station;
   computing by the relay station a channel bit Logarithmic Likelihood Ratio (LLR) quality information associated with the one or more data packets;
   sending by the relay station a bandwidth (BW) request to a base station, wherein the bandwidth request includes a reliability metric comprising an average magnitude of the channel bit LLRs; and
   when the subscriber station's direct transmission was not successfully decoded previously by the base station, at the base station:
      processing the bandwidth request, and
      based on the included reliability metric, determining an additional number of channel bit LLRs that are needed at the base station to result in a successful decoding of the one or more data packets.

8. The method of claim 7, further comprising prior to the sending by the relay station the bandwidth (BW) request to the base station:
   decoding by the relay station the one or more data packets; and
   when the packet is successfully decoded at the relay station, setting a high value for the reliability metric for inclusion in the bandwidth (BW) request.

9. The method of claim 7, further comprising prior to the sending by the relay station the bandwidth (BW) request to the base station:
   decoding by the relay station the one or more data packets; and
   when the packet is not successfully decoded at the relay station, computing the reliability metric based on the channel bit LLRs for inclusion in the bandwidth (BW) request.

10. The method of claim 7, further comprising after the sending by the relay station the bandwidth (BW) request to the base station:
   determining by the base station whether or not the original subscriber station's direct transmission was successfully decoded at the base station; and
   when the subscriber station's direct transmission was successfully decoded at the base station previously, not granting the bandwidth request to the relay station.

11. The method of claim 7, further comprising when the subscriber station's direct transmission was not successfully decoded previously by the base station, at the base station:
   granting the bandwidth request to the relay station to transmit the determined additional number of channel bit LLRs that are needed at the base station to result in a successful decoding of the one or more data packets.

12. A method for cooperative relaying within multi hop wireless communication systems, the method comprising:
   receiving at a plurality of relay stations, a transmission of one or more data packets from a subscriber station;
   computing by each of the relay stations a channel bit Logarithmic Likelihood Ratio (LLR) quality information associated with the one or more data packets;
   sending by each of the relay stations a bandwidth (BW) request to a base station, wherein the bandwidth request includes a reliability metric comprising an average magnitude of the channel bit LLRs; and
   when the subscriber station's direct transmission was not successfully decoded previously by the base station, at the base station:
      processing each of the bandwidth requests, and
      based on each of the included reliability metric, granting the bandwidth requests for at least some of the relay stations for transmission of the channel bit LLRs.

13. The method of claim 12, wherein each of the reliability metrics included with each of the bandwidth requests for the at least some of the relay stations which the base station grants associated bandwidth requests is above a predetermined threshold.

14. A method for cooperative relaying within multi hop wireless communication systems, the method comprising:
   receiving at a plurality of relay stations and a base station, a transmission of one or more data packets from a subscriber station;
   computing by each of the relay stations a channel bit Logarithmic Likelihood Ratio (LLR) quality information associated with the one or more data packets; and
   forwarding of the channel bit LLRs from at least some of the relay stations to the base station when the subscriber station's direct transmission was not successfully decoded previously by the base station.

* * * * *

UNITED STATES PATENT AND TRADEMARK OFFICE
CERTIFICATE OF CORRECTION

PATENT NO.        : 8,068,438 B2
APPLICATION NO.   : 12/265234
DATED             : November 29, 2011
INVENTOR(S)       : Sartori et al.

It is certified that error appears in the above-identified patent and that said Letters Patent is hereby corrected as shown below:

Title Page, Item (75), under "Inventors", in Column 1, Line 4, delete "Alrington" and insert -- Arlington --, therefor.

Title Page, Item (75), under "Inventors", in Column 1, Line 5, delete "Lyons" and insert -- Lyon --, therefor.

Signed and Sealed this
Eighteenth Day of December, 2012

David J. Kappos
*Director of the United States Patent and Trademark Office*